(12) United States Patent
Goto et al.

(10) Patent No.: US 11,104,199 B2
(45) Date of Patent: Aug. 31, 2021

(54) SUSPENSION CONTROL SYSTEM FOR VEHICLE

(71) Applicant: HONDA MOTOR CO., LTD., Tokyo (JP)

(72) Inventors: Yuya Goto, Wako (JP); Ryoma Kanda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 144 days.

(21) Appl. No.: 16/671,641

(22) Filed: Nov. 1, 2019

(65) Prior Publication Data

US 2020/0139781 A1 May 7, 2020

(30) Foreign Application Priority Data

Nov. 6, 2018 (JP) .............................. JP2018-209170

(51) Int. Cl.
*B60G 17/08* (2006.01)
*B60G 17/016* (2006.01)
*B60G 17/019* (2006.01)

(52) U.S. Cl.
CPC ....... *B60G 17/0162* (2013.01); *B60G 17/019* (2013.01); *B60G 17/08* (2013.01); *B60G 2202/24* (2013.01); *B60G 2400/0512* (2013.01); *B60G 2400/0521* (2013.01); *B60G 2400/204* (2013.01); *B60G 2400/252* (2013.01); *B60G 2500/10* (2013.01)

(58) Field of Classification Search
CPC ............ B60G 17/08; B60G 2400/0521; B60G 2500/10; B60G 2400/0511; B60G 2400/0522; B60G 2400/41; B60G 2400/204

USPC .......... 280/5.502, 5.506, 5.507, 5.508, 5.513
See application file for complete search history.

(56) References Cited

U.S. PATENT DOCUMENTS

| 8,838,336 | B2 | 9/2014 | Hirao et al. | |
|---|---|---|---|---|
| 9,061,562 | B2 * | 6/2015 | Hayakawa | ............. B60G 17/08 |
| 9,375,990 | B2 * | 6/2016 | Kanda | ............. B60G 17/01933 |
| 2012/0010780 | A1 * | 1/2012 | Hayashi | ................. B60G 17/08 |
| | | | | 701/37 |
| 2017/0240017 | A1 * | 8/2017 | Vandersmissen | ........................... |
| | | | | B60G 17/01908 |

(Continued)

FOREIGN PATENT DOCUMENTS

JP 2012046172 A 3/2012

*Primary Examiner* — Toan C To
(74) *Attorney, Agent, or Firm* — Armstrong Teasdale LLP

(57) ABSTRACT

A suspension control system includes: a pitch moment computation unit configured to compute a target pitch moment; a distribution ratio computation unit configured to compute a front and rear distribution ratio based on a roll rate and a vehicle speed, to compute a front distribution ratio based on the roll rate and the vehicle speed, and to compute a rear distribution ratio based on the roll rate and the vehicle speed; and a damping force computation unit configured to compute target damping forces of the dampers corresponding to respective front wheels based on the target pitch moment, the front and rear distribution ratio, and the front distribution ratio, and to compute target damping forces of the dampers corresponding to respective rear wheels based on the target pitch moment, the front and rear distribution ratio, and the rear distribution ratio.

6 Claims, 9 Drawing Sheets

(56) References Cited

U.S. PATENT DOCUMENTS

2019/0241038 A1* 8/2019 Katsuyama ............ B60G 17/06
2020/0139779 A1* 5/2020 Goto ...................... B60G 17/08

* cited by examiner

SUSPENSION CONTROL SYSTEM FOR VEHICLE

TECHNICAL FIELD

The present invention relates to a suspension control system for a vehicle including variable damping force dampers.

BACKGROUND ART

In a suspension control system for a vehicle, it is known to perform control such that a phase difference between a roll angle and a pitch angle becomes small to improve the feeling of steering stability and the like (see JP2012-46172A, for example). In this suspension control system, a target pitch angle and a target pitch moment are computed based on a roll rate, and a target damping force of each damper is computed based on the target pitch moment. Thus, the target pitch moment is computed based on the roll rate, so that roll behavior and pitch behavior can accord with each other. Thereby, front-down pitch behavior and roll behavior can be generated simultaneously at the time of steering, and therefore feeling can be improved.

However, if the front-down pitch behavior is generated in accordance with the roll behavior when the vehicle travels at a high speed, the roll behavior of the vehicle may become excessive to lower travel stability thereof.

SUMMARY OF THE INVENTION

In view of such a problem of the prior art, a primary object of the present invention is to provide a suspension control system for a vehicle including variable damping force dampers, in which a relationship between roll behavior and pitch behavior can be adjusted according to a vehicle speed.

To achieve such an object, one embodiment of the present invention provides a suspension control system (20) for a vehicle (100) having left and right front wheels (2fl, 2fr) and left and right rear wheels (2rl, 2rr), comprising: four variable damping force dampers (6) provided between a vehicle body (1) and the front wheels and between the vehicle body and the rear wheels; a roll rate sensor configured to detect a roll rate; a pitch moment computation unit (32) configured to compute a target pitch moment of the vehicle body based on the roll rate; a distribution ratio computation unit (33) configured to compute a front and rear distribution ratio of the target pitch moment between the front wheels and the rear wheels based on the roll rate and a vehicle speed, to compute a front distribution ratio of the target pitch moment between the left front wheel and the right front wheel based on the roll rate and the vehicle speed, and to compute a rear distribution ratio of the target pitch moment between the left rear wheel and the right rear wheel based on the roll rate and the vehicle speed; and a damping force computation unit (34) configured to compute target damping forces of the dampers corresponding to the respective front wheels based on the target pitch moment, the front and rear distribution ratio, and the front distribution ratio, and to compute target damping forces of the dampers corresponding to the respective rear wheels based on the target pitch moment, the front and rear distribution ratio, and the rear distribution ratio.

According to such an arrangement, the front and rear distribution ratio, the front distribution ratio, and the rear distribution ratio are adjusted based on the vehicle speed, so that the pitch moment of the vehicle can be adjusted. Thereby, a relationship between roll behavior and pitch behavior can be adjusted according to a vehicle speed, in the suspension control system.

Preferably, the distribution ratio computation unit is configured to set the front and rear distribution ratio such that the target damping forces of the dampers corresponding to the front wheels become greater as the vehicle speed becomes higher.

According to such an arrangement, the target damping force of each damper corresponding to the front wheels becomes greater as the vehicle speed becomes higher, so that each damper corresponding to the front wheels becomes less easy to retract, and therefore a front-down pitch behavior (nose dive) of the vehicle 100 is suppressed. As a result, the center of gravity of the vehicle becomes less easy to move forward in an area where the vehicle speed is high, and therefore, travel stability of the vehicle is improved.

Preferably, the damping force computation unit is configured to compute the target damping forces of the dampers corresponding to the front wheels located on an inside and an outside with respect to a turning direction of the vehicle, and to compute the target damping forces of the dampers corresponding to the rear wheels located on the inside and the outside with respect to the turning direction of the vehicle. Preferably, the distribution ratio computation unit is configured to set the front distribution ratio such that the target damping force of the damper corresponding to the front wheel located on the inside with respect to the turning direction of the vehicle becomes smaller as the vehicle speed becomes higher.

According to such an arrangement, the target damping force of the damper corresponding to the front wheel on the inside is smaller, i.e. the target damping force of the damper corresponding to the front wheel on the outside becomes greater, as the vehicle speed becomes higher. Thereby, the damper corresponding to the front wheel on the outside becomes less easy to retract, and therefore roll behavior of the vehicle is suppressed. As a result, travel stability of the vehicle is improved.

Preferably, the distribution ratio computation unit is configured to set the rear distribution ratio such that the target damping force of the damper corresponding to the rear wheel located on the inside with respect to the turning direction of the vehicle becomes greater as the vehicle speed becomes higher.

According to such an arrangement, the target damping force of the damper corresponding to the rear wheel on the inside becomes greater as the vehicle speed becomes higher. Thereby, the damper corresponding to the rear wheel on the inside becomes less easy to extend, and therefore roll behavior of the vehicle is suppressed. As a result, travel stability of the vehicle is improved.

Preferably, each damper comprises a magneto-rheological damper configured to change a damping force based on an electric current applied thereto, and the suspension control system further comprises: a stroke sensor (12) configured to detect a stroke position of each damper; and an electric current computation unit (36) configured to compute a target electric current of each damper based on the stroke position and the target damping force of each damper.

Thus, according to one embodiment of the present invention, it is possible to provide a suspension control system for a vehicle including variable damping force dampers, in which a relationship between roll behavior and pitch behavior can be adjusted according to a vehicle speed.

DESCRIPTION OF THE PREFERRED EMBODIMENT(S)

Figure 1:
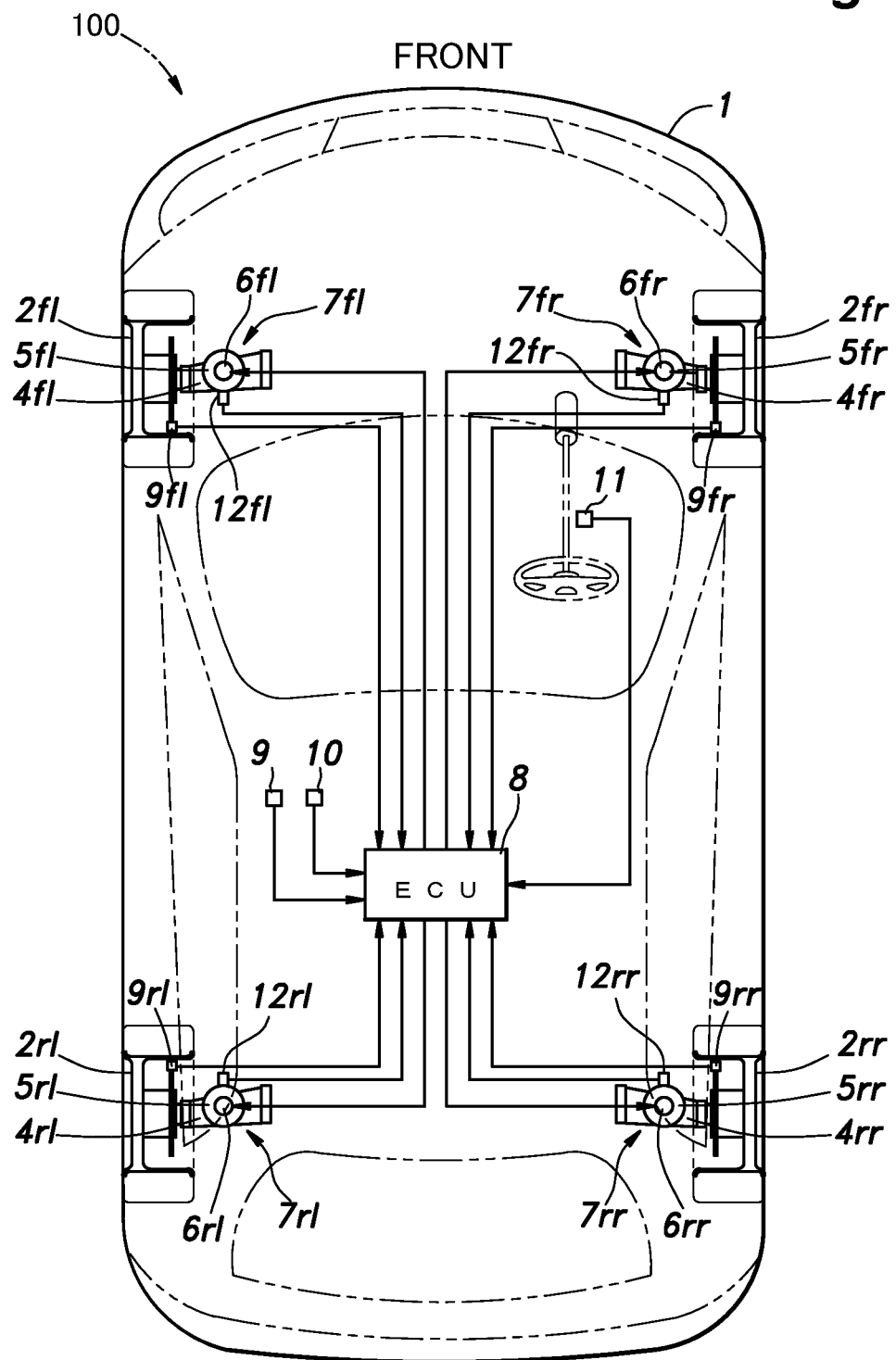
FIG. 1 is a schematic diagram of a vehicle provided with a suspension control system according to an embodiment of the present invention.

In the following, a four-wheeled vehicle 100 provided with a suspension control system 20 according to an embodiment of the present invention will be described with reference to the appended drawings. In the drawings, the reference numerals for the four wheels and the various components (such as dampers) associated with the wheels are appended with suffixes for indicating a front, a rear, a left, and a right. For example, the reference numeral "2" for the four wheels is appended with fl, fr, rl, or rr, such that "2fl (front, left)" denotes a left front wheel, "2fr (front, right)" denotes a right front wheel, "2rl (rear, left)" denotes a left rear wheel, and "2rr (rear, right)" denotes a right rear wheel.

As shown in FIG. 1, the wheels 2 are installed at a left front side, a right front side, a left rear side, and a right rear side of a vehicle body 1 of the vehicle 100. Each of these wheels 2 is supported by the vehicle body 1 via a suspension device 7 including a suspension arm 4, a spring 5, a variable damping force damper 6 (hereinafter, simply referred to as a damper 6), and the like. In the present embodiment, the vehicle 100 consists of an FF vehicle whose front wheels 2fl, 2fr are driven.

The vehicle 100 includes an Electronic Control Unit 8 (ECU) and sensors, such as a vehicle speed sensor 9, a roll rate sensor 10, a steering angle sensor 11, stroke sensors 12, and the like. The ECU 8 is utilized for various control. The vehicle speed sensor 9 detects a vehicle speed Vx in the fore-and-aft direction of the vehicle 100. For example, the vehicle speed sensor 9 may detect a wheel speed of each wheel 2 and obtain the vehicle speed Vx by averaging the wheel speed of each wheel 2. The roll rate sensor 10 detects a roll rate Vr (roll speed) generated around the center of gravity of the vehicle 100. For example, the roll rate sensor 10 may consist of any per se known gyro sensor. Alternatively, the roll rate sensor 10 may consist of a pair of vertical acceleration sensors arranged on right and left parts of the vehicle body 1, and obtain the roll rate Vr based on right and left vertical acceleration of the vehicle body 1. The steering angle sensor 11 obtains a steering angle δ of the vehicle 100. For example, the steering angle sensor 11 may obtain the steering angle δ by detecting a turning angle of a steering shaft. Each stroke sensor 12 is installed in the corresponding damper 6, and detects a stroke position Sp (extending/retracting position) of the damper 6. The vehicle 100 may include other sensors, such as a yaw rate sensor for detecting a yaw rate of the vehicle body 1, a brake pressure sensor for detecting a brake fluid pressure of a brake device, a torque sensor for detecting a driving torque of the vehicle 100, a gear position sensor for detecting a gear position of a transmission device, and the like.

The ECU 8 includes a microcomputer, a ROM, a RAM, peripheral circuits, an input/output interface, various drivers, and the like, and is connected to the dampers 6 of the respective wheels 2 and the sensors 9-12 via a communication line, such as a Controller Area Network (CAN). The suspension control system 20 is constituted of the ECU 8, the sensors 9-12, and the like.

The dampers 6 are provided between the vehicle body 1 and the respective wheels 2. Each damper 6 may consist of any per se known variable damping force damper that can change the damping force based on an electric signal input from the ECU 8. For example, each damper 6 consists of a magneto-rheological damper (MR damper) that uses a magneto-rheological fluid (MRF) as the damping fluid and is provided with a pair of chambers separated by a piston and communicated with each other via a communication passage (orifice) fitted with a coil for selectively creating a magnetic field in the communication passage. Alternatively, each damper 6 may have a communication passage whose cross-sectional area can be varied by an input electric signal applied to a suitable device provided in the communication passage. In the present embodiment, each damper 6 consists of an MR damper. When an electric current is applied to the coil from the ECU 8, the magnetic field is applied to the MRF flowing through the communication passage, so that ferromagnetic particles in the MRF form chain clusters. Thereby, the viscosity of the MRF flowing through the communication passage increases, so that the damping force of each damper 6 increases. The damper 6 includes a cylinder and a piston rod. A lower end of the cylinder is connected to an upper face of the suspension arm 4, which may be considered as a wheel side member. An upper end of the piston rod is connected to a damper base (an upper part of a wheel house), which may be considered as a vehicle body side member.

Figure 2:
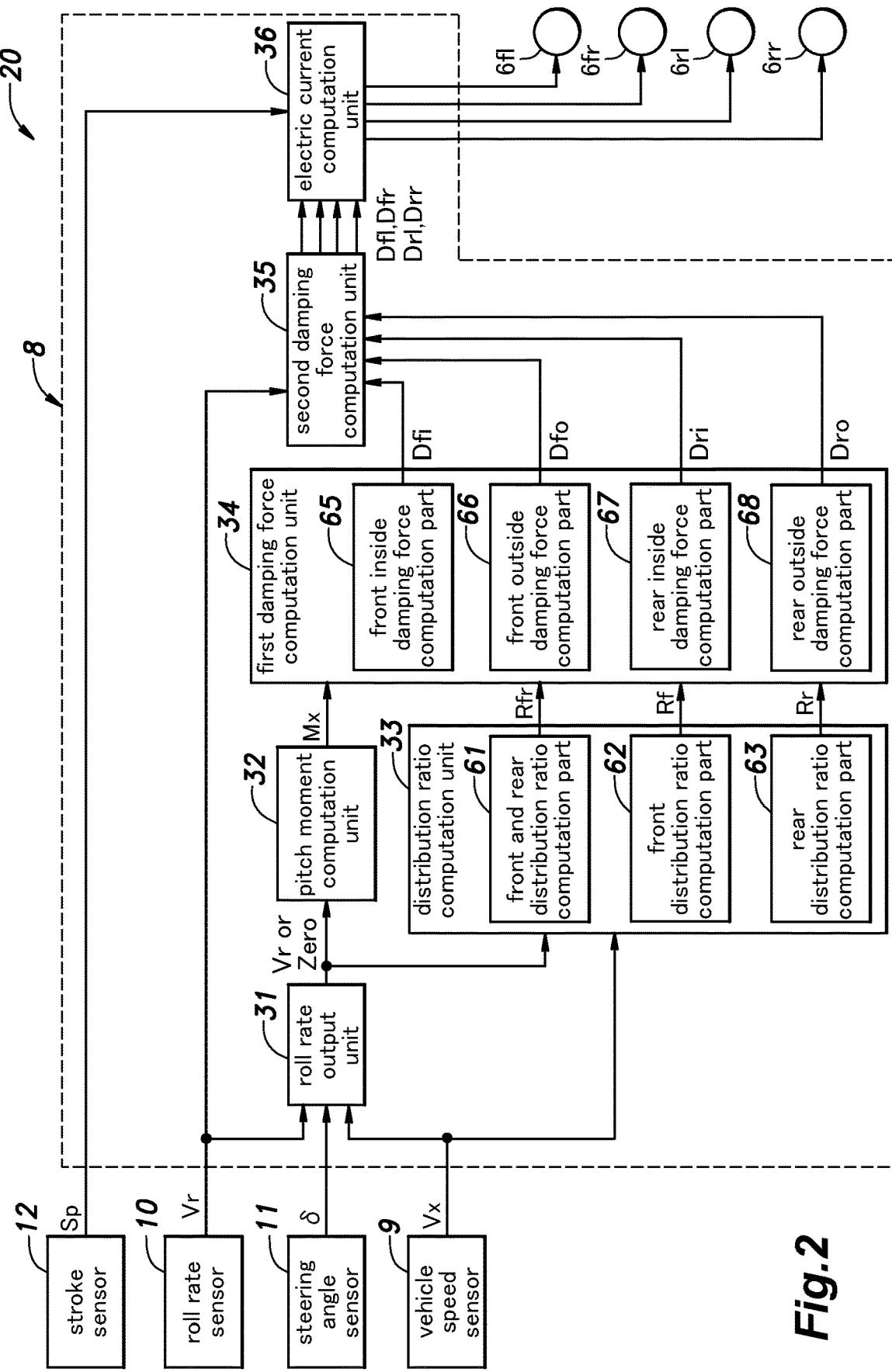
FIG. 2 is a block diagram of the suspension control system.

As shown in FIG. 2, the ECU 8 includes a roll rate output unit 31, a pitch moment computation unit 32, a distribution ratio computation unit 33, a first damping force computation unit 34, a second damping force computation unit 35, and an electric current computation unit 36.

Figure 3:
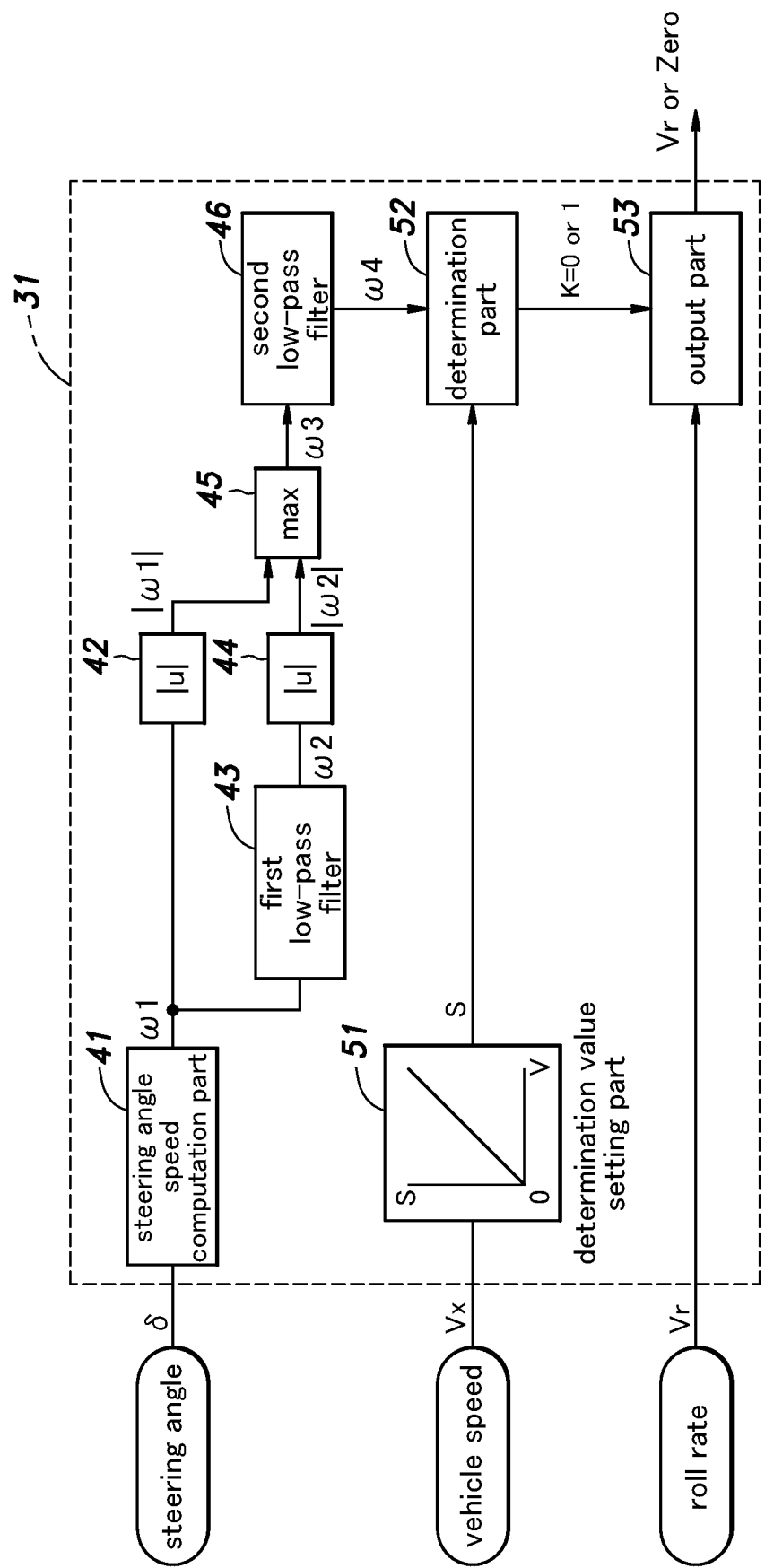
FIG. 3 is a block diagram of a roll rate output unit.

As shown in FIG. 3, the roll rate output unit 31 includes a steering angle speed computation part 41, a first absolute value computation part 42, a first low-pass filter 43, a second absolute value computation part 44, a maximum value selection part 45, a second low-pass filter 46, a determination value setting part 51, a determination part 52, and an output part 53. The roll rate output unit 31 performs a computation based on the roll rate Vr detected by the roll rate sensor 10, the steering angle δ detected by the steering angle sensor 11, and the vehicle speed Vx detected by the vehicle speed sensor 9, and outputs the roll rate Vr or zero.

The steering angle speed computation part 41 computes a steering angle speed ω1 (a signal ω1) by differentiating the steering angle δ with respect to time. The first absolute value computation part 42 converts the steering angle speed ω1 output from the steering angle speed computation part 41 to a first absolute value |ω1|, which is an absolute value of the steering angle speed ω1. The first low-pass filter 43 removes or reduces a frequency component higher than a first cutoff frequency from the steering angle speed ω1 output from the steering angle speed computation part 41 to thereby convert the steering angle speed ω1 to a signal ω2 (first signal). That is, the first low-pass filter 43 performs low-pass filtering on the steering angle speed ω1 to output the signal ω2 obtained thereby. The second absolute value computation part 44 converts the signal ω2 output from the first low-pass filter 43 to a second absolute value |ω2|, which is an absolute value of the signal ω2. The maximum value selection part 45 selects greater one of the first absolute value |ω1| output from the first absolute value computation part 42 and the second absolute value |ω2| output from the second absolute value computation part 44 to output the selected one of the first absolute value |ω1| and the second absolute value |ω2| as a signal ω3 (second signal). The signal ω3 is equal to or greater than "0." The second low-pass filter 46 removes or reduces a frequency component higher than a second cutoff frequency from the signal ω3 to thereby convert the signal ω3 to a signal ω4 (third signal). That is, the second low-pass filter 46 performs low-pass filtering on the signal ω3 to output the signal ω4 obtained thereby. The signal ω4 is a signal based on the steering angle speed ω1, and is equal to or greater than "0." The signal ω4 increases and decreases based on a steering input.

The determination value setting part 51 refers to a determination value map based on the vehicle speed Vx to set a determination value S corresponding to the vehicle speed Vx. The determination value map defines a relationship between the vehicle speed Vx and the determination value S. Thus, the determination value setting part 51 changes the determination value S based on the vehicle speed Vx. In the determination value map, for example, the relationship between the vehicle speed Vx and the determination value S is defined such that the determination value S increases in direct proportion to the vehicle speed Vx.

The determination part 52 determines if the signal ω4 output from the second low-pass filter 46 is equal to or greater than the determination value S output from the determination value setting part 51. The determination part 52 sets a coefficient K at "1" if the signal ω4 is equal to or greater than the determination value S. The coefficient K represents a determination result of the determination part 52. The determination part 52 sets the coefficient K at "0" if the signal ω4 is less than the determination value S. It is possible to presume that a prescribed steering input is present if the signal ω4 is equal to or greater than the determination value S.

The output part 53 computes an output of the roll rate output unit 31 by multiplying the roll rate Vr detected by the roll rate sensor 10 and the coefficient K output from the determination part 52. Thus, the output part 53 (and hence the roll rate output unit 31) outputs the roll rate Vr as it is if the coefficient K is set at "1" and outputs zero if the coefficient K is set at "0."

The pitch moment computation unit 32 computes a target pitch moment Mx of the vehicle body 1 based on the output of the roll rate output unit 31. The target pitch moment Mx represents a pitch moment to be generated around the center of gravity of the vehicle body 1. For example, the pitch moment computation unit 32 may refer to a prescribed map based on the roll rate Vr to set the target pitch moment Mx corresponding to the roll rate Vr.

The distribution ratio computation unit 33 computes a front and rear distribution ratio Rfr, a front distribution ratio Rf, and a rear distribution ratio Rr, which are used for distributing the target pitch moment Mx, based on the roll rate Vr and the vehicle speed Vx. The front and rear distribution ratio Rfr is a distribution ratio of the target pitch moment Mx between the front wheels 2fl, 2fr and the rear wheels 2rl, 2rr. The front and rear distribution ratio Rfr is a value from 0 to 1 inclusive. As the front and rear distribution ratio Rfr approaches 0, the distribution of the target pitch moment Mx to the rear wheels 2rl, 2rr increases. As the front and rear distribution ratio Rfr approaches 1, the distribution of the target pitch moment Mx to the front wheels 2fl, 2fr increases. The front distribution ratio Rf is a distribution ratio of the target pitch moment Mx between the left front wheel 2fl and the right front wheel 2fr. The front distribution ratio Rf is a value from 0 to 1 inclusive. As the front distribution ratio Rf approaches 0, the distribution of the target pitch moment Mx to the front wheel 2fl, 2fr located on an outside with respect to the turning direction of the vehicle 100 increases. As the front distribution ratio Rf approaches 1, the distribution of the target pitch moment Mx to the front wheel 2fl, 2fr located on an inside with respect to the turning direction of the vehicle 100 increases. The rear distribution ratio Rr is a distribution ratio of the target pitch moment Mx between the left rear wheel 2rl and the right rear wheel 2rr. The rear distribution ratio Rr is a value from 0 to 1 inclusive. As the rear distribution ratio Rr approaches 0, the distribution of the target pitch moment Mx to the rear wheel 2rl, 2rr located on the outside with respect to the turning direction of the vehicle 100 increases. As the rear distribution ratio Rr approaches 1, the distribution of the target pitch moment Mx to the rear wheel 2rl, 2rr located on the inside with respect to the turning direction of the vehicle 100 increases.

Figure 4:
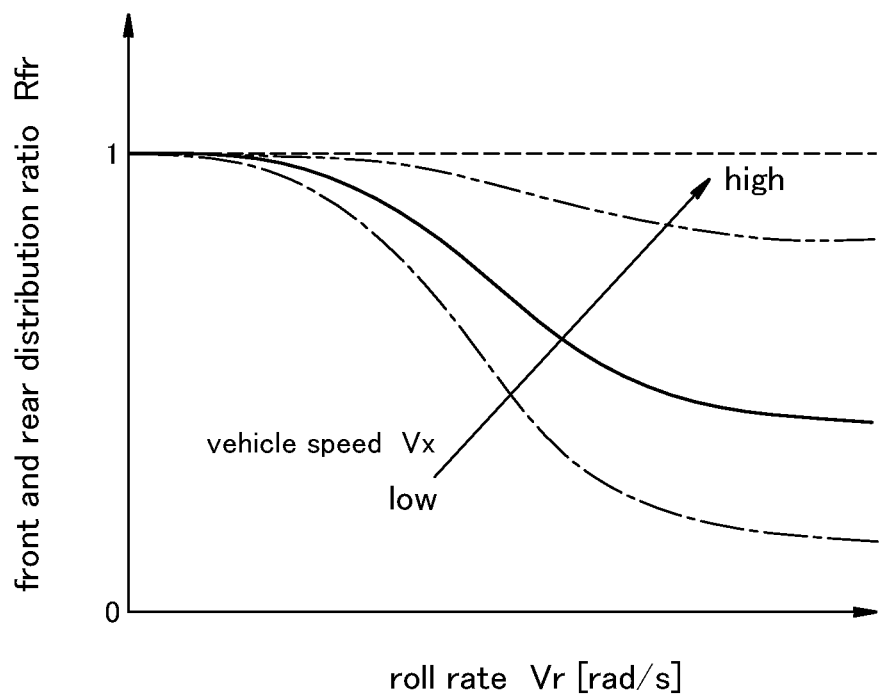
FIG. 4 is a front and rear distribution ratio map showing a relationship between a vehicle speed, a roll rate, and a front and rear distribution ratio.

The distribution ratio computation unit 33 includes a front and rear distribution ratio computation part 61, a front distribution ratio computation part 62, and a rear distribution ratio computation part 63. The front and rear distribution ratio computation part 61 refers to a front and rear distribution ratio map shown in FIG. 4 based on the vehicle speed Vx and the roll rate Vr to set the front and rear distribution ratio Rfr corresponding to the vehicle speed Vx and the roll rate Vr. The front and rear distribution ratio map defines a relationship between the vehicle speed Vx, the roll rate Vr, and the front and rear distribution ratio Rfr. In the front and rear distribution ratio map, the front and rear distribution ratio Rfr decreases (distribution to the front wheels 2fl, 2fr decreases) as the roll rate Vr increases. Also, a decreasing amount of the front and rear distribution ratio Rfr becomes greater as the vehicle speed Vx becomes lower. As the front and rear distribution ratio Rfr decreases, a front part of the vehicle body 1 tends to be lowered.

Figure 5:
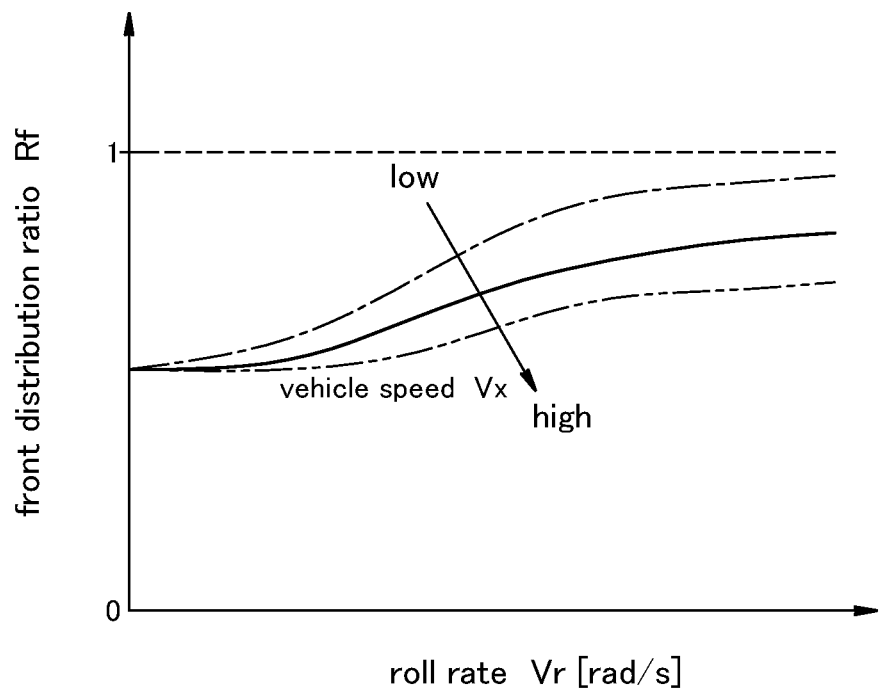
FIG. 5 is a front distribution ratio map showing a relationship between the vehicle speed, the roll rate, and a front distribution ratio.

The front distribution ratio computation part 62 refers to a front distribution ratio map shown in FIG. 5 based on the vehicle speed Vx and the roll rate Vr to set the front distribution ratio Rf corresponding to the vehicle speed Vx and the roll rate Vr. The front distribution ratio map defines a relationship between the vehicle speed Vx, the roll rate Vr, and the front distribution ratio Rf. In the front distribution ratio map, the front distribution ratio Rf increases (distribution to the front wheel 2fl, 2fr located on the outside decreases) as the roll rate Vr increases. Also, an increasing amount of the front distribution ratio Rf becomes greater (the distribution to the front wheel 2fl, 2fr located on the outside decreases) as the vehicle speed Vx becomes lower. As the front distribution ratio Rf increases, the side of the vehicle body 1 corresponding to the front wheel 2fl, 2fr located on the outside tends to be lowered.

Figure 6:
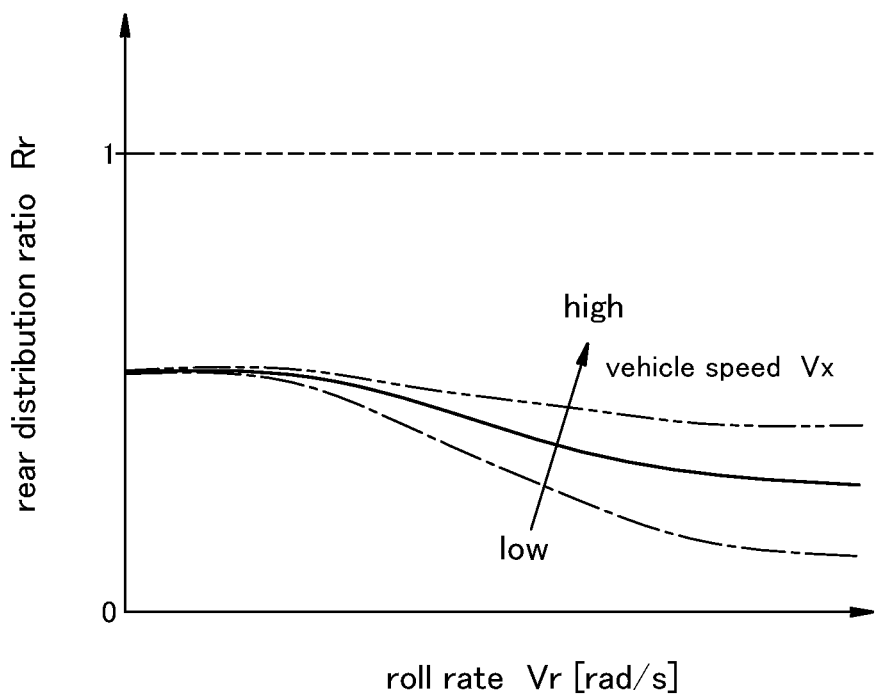
FIG. 6 is a rear distribution ratio map showing a relationship between the vehicle speed, the roll rate, and a rear distribution ratio.

The rear distribution ratio computation part 63 refers to a rear distribution ratio map shown in FIG. 6 based on the vehicle speed Vx and the roll rate Vr to set the rear distribution ratio Rr corresponding to the vehicle speed Vx and the roll rate Vr. The rear distribution ratio map defines a relationship between the vehicle speed Vx, the roll rate Vr, and the rear distribution ratio Rr. In the rear distribution ratio map, the rear distribution ratio Rr decreases (distribution to the rear wheel 2rl, 2rr located on the outside increases) as the roll rate Vr increases. Also, a decreasing amount of the rear distribution ratio Rr becomes greater (distribution to the rear wheel 2rl, 2rr located on the outside increases) as the vehicle speed Vx becomes lower. As the rear distribution ratio Rr decreases, the side of the vehicle body 1 corresponding to the rear wheel 2rl, 2rr located on the outside tends to be firm.

The first damping force computation unit 34 computes target damping forces Dfi, Dfo of the dampers 6 respectively corresponding to the front wheels located on the inside and the outside with respect to the turning direction of the vehicle 100, based on the target pitch moment Mx, the front and rear distribution ratio Rfr, and the front distribution ratio Rf. The first damping force computation unit 34 also computes target damping forces Dri, Dro of the dampers 6 respectively corresponding to the rear wheels located on the inside and the outside with respect to the turning direction of the vehicle 100, based on the target pitch moment Mx, the front and rear distribution ratio Rfr, and the rear distribution ratio Rr.

The first damping force computation unit 34 includes a front inside damping force computation part 65, a front outside damping force computation part 66, a rear inside damping force computation part 67, and a rear outside damping force computation part 68. The front inside damping force computation part 65 computes a front inside wheel target damping force Dfi based on the following formula (1). The front outside damping force computation part 66 computes a front outside wheel target damping force Dfo based on the following formula (2). The rear inside damping force computation part 67 computes a rear inside wheel target damping force Dri based on the following formula (3). The rear outside damping force computation part 68 computes a rear outside wheel target damping force Dro based on the following formula (4).

$$Dfi = Mx \times Rfr \times Rf \quad (1)$$

$$Dfo = Mx \times Rfr \times (1-Rf) \quad (2)$$

$$Dri = Mx \times (1-Rfr) \times Rr \quad (3)$$

$$Dro = Mx \times (1-Rfr) \times (1-Rr) \quad (4)$$

The second damping force computation unit 35 sets a left front wheel target damping force Dfl, a right front wheel target damping force Dfr, a left rear wheel target damping force Drl, and a right rear wheel target damping force Drr, based on the roll rate Vr, the front inside wheel target damping force Dfi, the front outside wheel target damping force Dfo, the rear inside wheel target damping force Dri, and the rear outside wheel target damping force Dro. The second damping force computation unit 35 computes a roll angle by integrating the roll rate Vr. The second damping force computation unit 35 sets the front inside wheel target damping force Dfi as the left front wheel target damping force Dfl, the front outside wheel target damping force Dfo as the right front wheel target damping force Dfr, the rear inside wheel target damping force Dri as the left rear wheel target damping force Drl, and the rear outside wheel target damping force Dro as the right rear wheel target damping force Drr, if the roll angle is positive (if the vehicle 100 turns left). On the other hand, the second damping force computation unit 35 sets the front outside wheel target damping force Dfo as the left front wheel target damping force Dfl, the front inside wheel target damping force Dfi as the right front wheel target damping force Dfr, the rear outside wheel target damping force Dro as the left rear wheel target damping force Drl, and the rear inside wheel target damping force Dri as the right rear wheel target damping force Drr, if the roll angle is negative (if the vehicle 100 turns right). The second damping force computation unit 35 sets "0" as each of the left front wheel target damping force Dfl, the right front wheel target damping force Dfr, the left rear wheel target damping force Drl, and the right rear wheel target damping force Drr, if the roll angle is "0."

Figure 7:
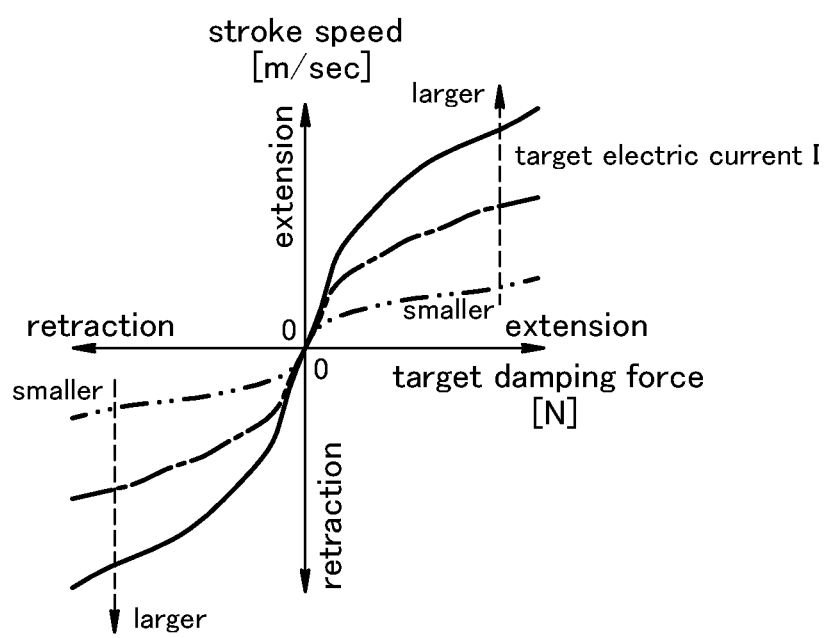
FIG. 7 is an electric current map showing a relationship between a target damping force, a stroke speed, and a target electric current.

The electric current computation unit 36 sets a target electric current for each damper 6 based on the target damping forces Dfl, Dfr, Drl, Drr and a stroke speed Sv. The electric current computation unit 36 obtains the stroke speed Sv by differentiating the stroke position Sp detected by the stroke sensor 12 corresponding to each damper 6. For example, the electric current computation unit 36 refers to an electric current map shown in FIG. 7 based on the target damping force D corresponding to each damper 6 and the stroke speed Sv to set the target electric current. Each damper 6 generates a damping force in accordance with the corresponding target electric current supplied thereto.

In the following, the effects and the advantages of the suspension control system 20 having the aforementioned structure will be described. In the suspension control system 20, the target pitch moment Mx is computed based on the roll rate Vr, and the target damping force D of each damper 6 is computed by distributing the target pitch moment Mx. Thereby, preferable ride feeling can be realized by matching the phase of roll behavior and that of pitch behavior.

The roll rate output unit 31 determines if the signal ω4 based on the steering angle speed ω1 (signal ω1) is equal to or greater than the determination value S, and outputs zero or the roll rate Vr detected by the roll rate sensor 10 based on the determination result. Thereby, the roll rate output unit 31 can remove the roll rate caused by a road surface input from the roll rate Vr detected by the roll rate sensor 10, and output the roll rate Vr caused by a steering input.

Figure 8A:
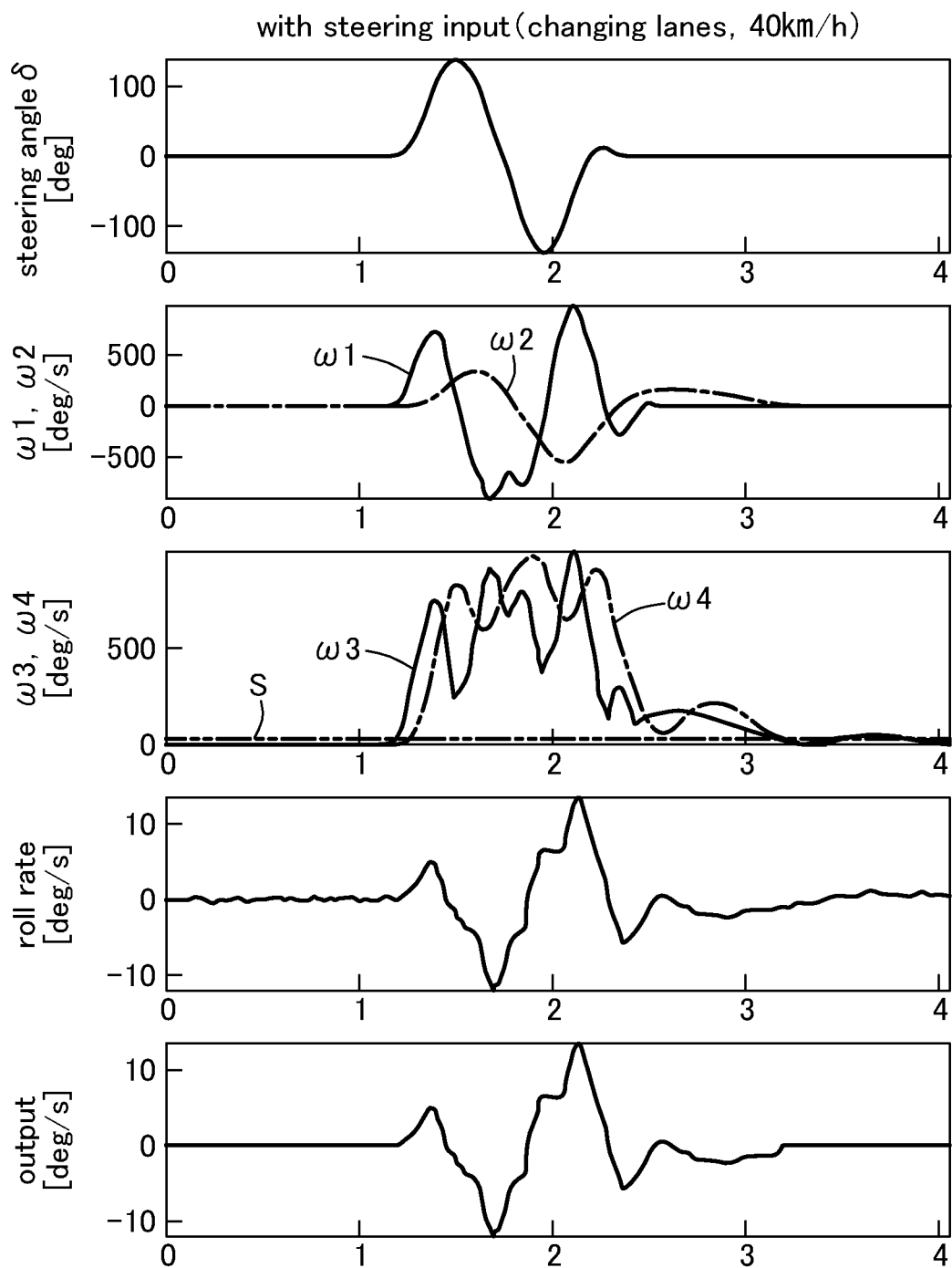
FIG. 8A is a diagram showing a steering angle, signals ω1-ω4, a roll rate, and an output of the roll rate output unit in a case where a steering input is present.
Figure 8B:
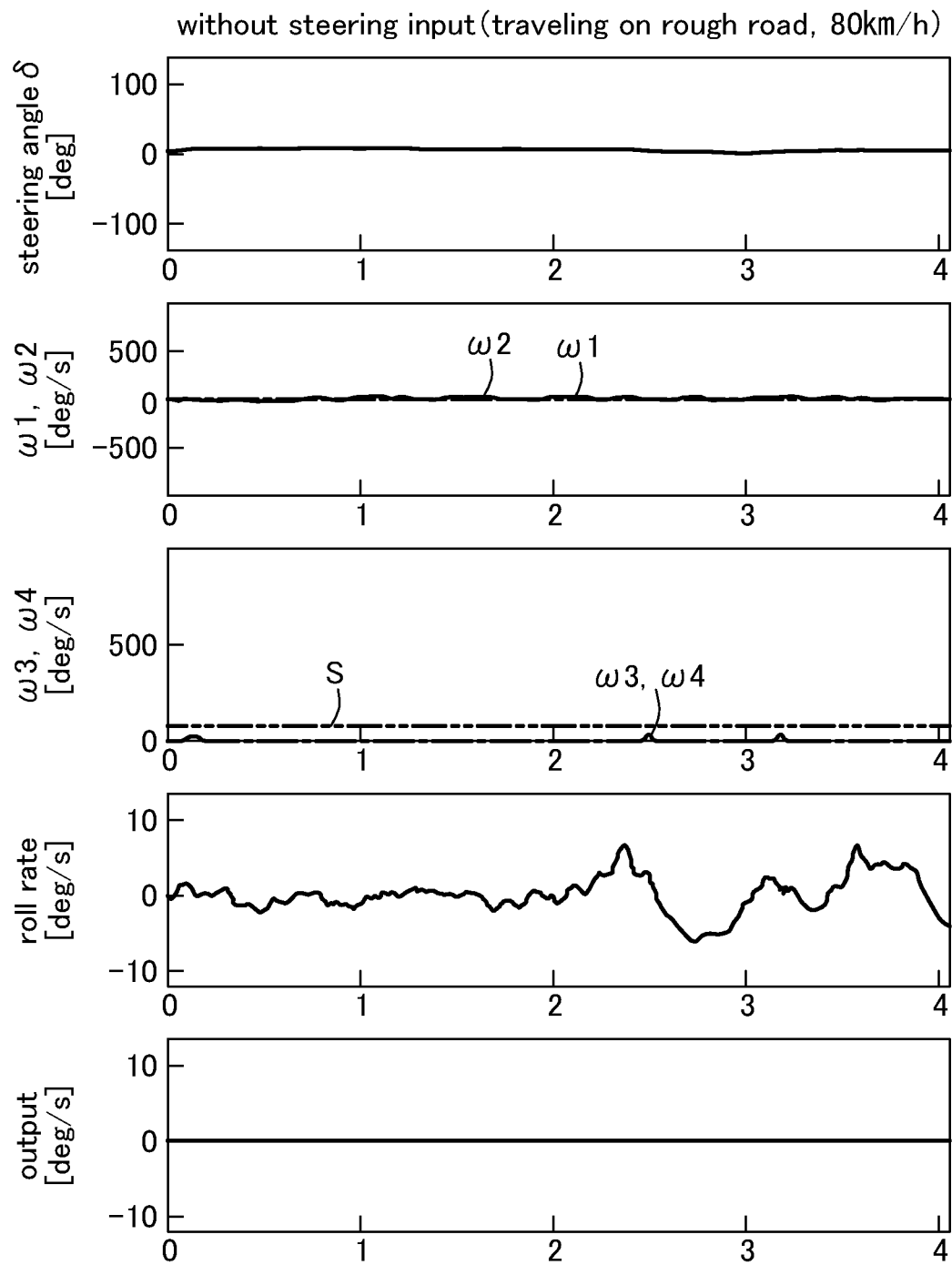
FIG. 8B is a diagram showing the steering angle, the signals ω1-ω4, the roll rate, and the output of the roll rate output unit in a case where the steering input is absent.

FIG. 8A is a diagram showing an example of a processing result of the roll rate output unit 31 in the case where the steering input is present (the vehicle 100 changes lanes at 40 km/h). FIG. 8B is a diagram showing an example of a processing result of the roll rate output unit 31 in the case where the steering input is absent (the vehicle 100 travels on a rough road at 80 km/h).

Each of FIGS. 8A and 8B shows the steering angle speed ω1 (signal ω1) obtained by differentiating the steering angle δ with respect to time, the signal ω2 obtained by processing the steering angle speed ω1 by the first low-pass filter 43, the signal ω3 obtained by the process of the maximum value selection part 45, the signal ω4 obtained by processing the signal ω3 by the second low-pass filter 46, the roll rate Vr, and the output of the roll rate output unit 31. As shown in FIG. 8A, when the vehicle 100 changes lanes, the roll rate output unit 31 outputs the roll rate Vr if the signal ω4 is equal to or greater than the determination value S, while the roll rate output unit 31 outputs zero if the signal ω4 is less than the determination value S. As shown in FIG. 8B, when the vehicle 100 travels on a rough road, the roll rate Vr increases and decreases even if the steering input is absent. However, the roll rate output unit 31 outputs zero since the steering input is absent and the signal ω4 is less than the determination value S. Thus, the roll rate output unit 31 can output the roll rate Vr after removing the roll rate caused by a road surface input therefrom. Incidentally, the vehicle speed Vx in the condition of FIG. 8B is higher than that in the condition of FIG. 8A. Therefore, the determination value S in FIG. 8B is set higher than the determination value S in FIG. 8A according to the increase of the vehicle speed Vx.

In the suspension control system 20, since the control is performed based on a detection value of the roll rate sensor 10, the target damping force D of each damper 6 can be set in consideration of a load on the vehicle 100 and an influence of aerodynamics in a high-speed area.

In the suspension control system 20, the damping force generated at each damper 6 can be changed according to the vehicle speed Vx and the roll rate Vr by setting the front and rear distribution ratio Rfr, the front distribution ratio Rf, and the rear distribution ratio Rr based on the vehicle speed Vx and the roll rate Vr. That is, in the suspension control system 20, the relationship between roll behavior and pitch behavior can be adjusted based on the vehicle speed Vx and the roll rate Vr.

The front and rear distribution ratio computation part 61 sets the front and rear distribution ratio Rfr such that the target damping forces Dfl, Dfr of the dampers 6fl, 6fr corresponding to the front wheels 2fl, 2fr become greater as the vehicle speed Vx becomes higher. Thereby, the dampers 6fl, 6fr corresponding to the front wheels 2fl, 2fr become less easy to retract, and therefore, a front-down pitch behavior (nose dive) of the vehicle 100 is suppressed. As a result, the center of gravity of the vehicle 100 becomes less likely to move forward in an operating condition where the vehicle speed Vx is high, and therefore, the travel stability of the vehicle 100 is improved. On the other hand, the front and rear distribution ratio computation part 61 sets the front and rear distribution ratio Rfr such that the target damping forces Dfl, Dfr of the dampers 6fl, 6fr corresponding to the front wheels 2fl, 2fr become smaller as the vehicle speed Vx becomes lower. Thereby, the dampers 6fl, 6fr corresponding to the front wheels 2fl, 2fr become easier to retract, and therefore, the front-down pitch behavior of the vehicle 100 is promoted. As a result, the center of gravity of the vehicle 100 becomes more likely to move forward, and therefore, the turning performance of the vehicle 100 is improved when the vehicle speed Vx is low.

The front distribution ratio computation part 62 sets the front distribution ratio Rf such that the target damping force Dfi of the damper 6fl, 6fr corresponding to the front wheel 2fl, 2fr located on the inside with respect to the turning direction becomes smaller as the vehicle speed Vx becomes higher. Accordingly, the target damping force Dfo of the damper 6fl, 6fr corresponding to the front wheel 2fl, 2fr located on the outside becomes greater as the vehicle speed Vx becomes higher. Thereby, the damper 6fl, 6fr corresponding to the front wheel 2fl, 2fr located on the outside becomes less easy to retract, and therefore, the roll behavior of the vehicle 100 is suppressed. As a result, the travel stability of the vehicle 100 is improved in a state where the vehicle speed Vx is high. On the other hand, the target damping force Dfo of the damper 6fl, 6fr corresponding to the front wheel 2fl, 2fr located on the outside becomes smaller as the vehicle speed Vx becomes lower, so that the damper 6fl, 6fr corresponding to the front wheel 2fl, 2fr located on the outside becomes easier to retract. As a result, the center of gravity of the vehicle 100 becomes more likely to move toward the side of the wheels 2 located on the outside, and therefore, the turning performance of the vehicle 100 is improved when the vehicle speed Vx is low.

The rear distribution ratio computation part 63 sets the rear distribution ratio Rr such that the target damping force Dri of the damper 6rl, 6rr corresponding to the rear wheel 2rl, 2rr located on the inside with respect to the turning direction becomes greater as the vehicle speed Vx becomes higher. Thereby, the damper 6rl, 6rr corresponding to the rear wheel 2rl, 2rr located on the inside becomes less easy to extend, and therefore, the roll behavior of the vehicle 100 is suppressed. As a result, the travel stability of the vehicle 100 is improved in a state where the vehicle speed Vx is high. On the other hand, the target damping force Dri of the damper 6rl, 6rr corresponding to the rear wheel 2rl, 2rr located on the inside becomes smaller as the vehicle speed Vx becomes lower, so that the damper 6rl, 6rr corresponding to the rear wheel 2rl, 2rr located on the inside becomes easier to extend. As a result, the center of gravity of the vehicle 100 becomes more likely to move toward the side of the wheels 2 located on the outside, and therefore, the turning performance of the vehicle 100 is improved when the vehicle speed Vx is low.

Concrete embodiments of the present invention have been described in the foregoing, but the present invention should not be limited by the foregoing embodiments and various modifications and alterations are possible within the scope of the present invention. For example, the configuration of the roll rate output unit 31 may be appropriately changed. For example, the configuration of the roll rate output unit 31 may be changed such that the determination part 52 makes a determination based on one of the signal ω1 (steering angle speed ω1), signal ω2, and signal ω3, instead of signal ω4.

The invention claimed is:

1. A suspension control system for a vehicle having left and right front wheels and left and right rear wheels, comprising:
    four variable damping force dampers provided between a vehicle body and the front wheels and between the vehicle body and the rear wheels;
    a roll rate sensor configured to detect a roll rate;
    a pitch moment computation unit configured to compute a target pitch moment of the vehicle body based on the roll rate;
    a distribution ratio computation unit configured to compute a front and rear distribution ratio of the target pitch moment between the front wheels and the rear wheels based on the roll rate and a vehicle speed, to compute a front distribution ratio of the target pitch moment between the left front wheel and the right front wheel based on the roll rate and the vehicle speed, and to compute a rear distribution ratio of the target pitch moment between the left rear wheel and the right rear wheel based on the roll rate and the vehicle speed; and
    a damping force computation unit configured to compute target damping forces of the dampers corresponding to the respective front wheels based on the target pitch moment, the front and rear distribution ratio, and the front distribution ratio, and to compute target damping forces of the dampers corresponding to the respective rear wheels based on the target pitch moment, the front and rear distribution ratio, and the rear distribution ratio.

2. The suspension control system according to claim 1, wherein the distribution ratio computation unit is configured to set the front and rear distribution ratio such that the target damping forces of the dampers corresponding to the front wheels become greater as the vehicle speed becomes higher.

3. The suspension control system according to claim 1, wherein the damping force computation unit is configured to compute the target damping forces of the dampers corresponding to the front wheels located on an inside and an outside with respect to a turning direction of the vehicle, and to compute the target damping forces of the dampers corresponding to the rear wheels located on the inside and the outside with respect to the turning direction of the vehicle.

4. The suspension control system according to claim 3, wherein the distribution ratio computation unit is configured to set the front distribution ratio such that the target damping force of the damper corresponding to the front wheel located on the inside with respect to the turning direction of the vehicle becomes smaller as the vehicle speed becomes higher.

5. The suspension control system according to claim 3, wherein the distribution ratio computation unit is configured to set the rear distribution ratio such that the target damping force of the damper corresponding to the rear wheel located on the inside with respect to the turning direction of the vehicle becomes greater as the vehicle speed becomes higher.

6. The suspension control system according to claim 1, wherein each damper comprises a magneto-rheological damper configured to change a damping force based on an electric current applied thereto, and the suspension control system further comprises:
a stroke sensor configured to detect a stroke position of each damper; and
an electric current computation unit configured to compute a target electric current of each damper based on the stroke position and the target damping force of each damper.

* * * * *